Nov. 3, 1936.  A. NAGEL  2,059,892
SHUTTER ACTUATING MECHANISM
Filed March 3, 1936
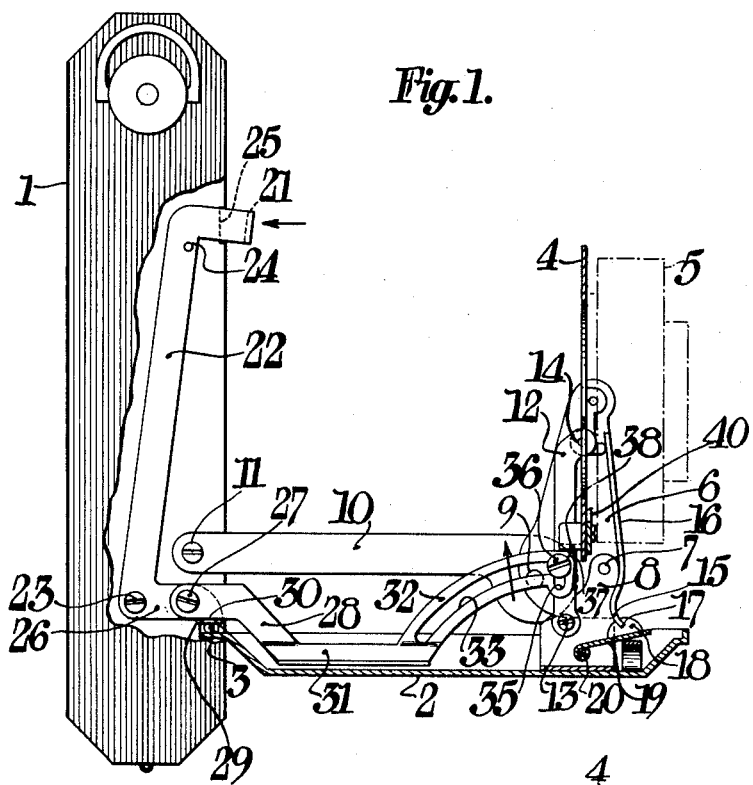
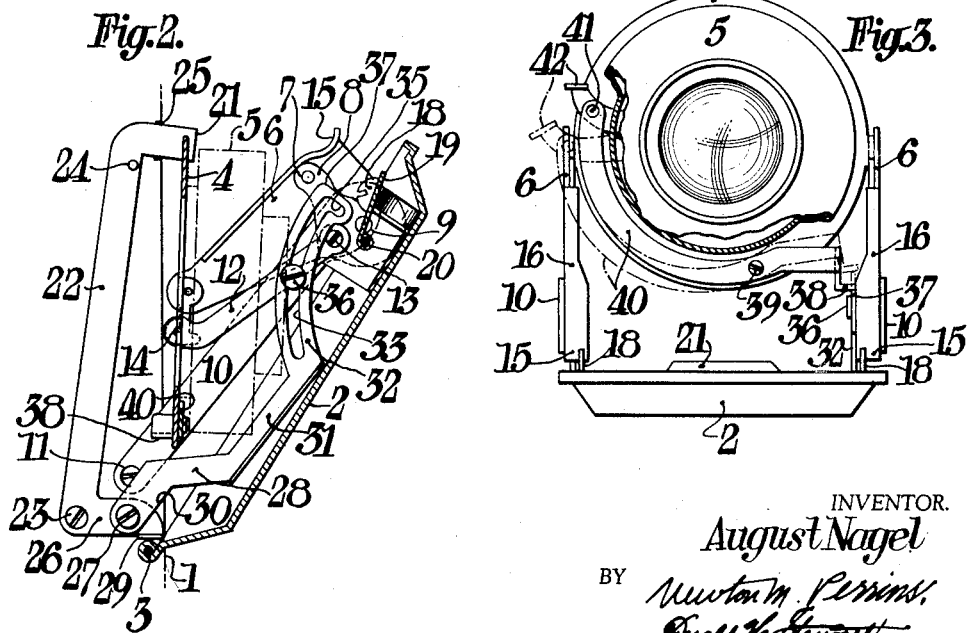
INVENTOR.
August Nagel
BY
ATTORNEYS.

Patented Nov. 3, 1936

2,059,892

UNITED STATES PATENT OFFICE 2,059,892

SHUTTER ACTUATING MECHANISM

August Nagel, Stuttgart, Germany, assignor, by mesne assignments, to Eastman Kodak Company, Jersey City, N. J., a corporation of New Jersey Application March 3, 1936, Serial No. 66,845
In Germany September 17, 1935

10 Claims. (Cl. 95—53)

This invention relates to photography, and more particularly to photographic cameras. One object of my invention is to provide a photographic camera of the collapsible or folding type with mechanism by which the shutter may be actuated from the camera body. Another object of my invention is to provide a shutter actuating mechanism which is normally projected from the camera body when the camera is opened and is retracted against the camera body when the camera is closed. Another object of my invention is to provide a linkage from the camera body to the camera shutter adapted to transmit motion from the camera body to the shutter and also adapted to permit the shutter to be actuated by the shutter trigger in the usual manner. Other objects will appear from the following specification, the novel features being particularly pointed out in the claims at the end thereof.

In most of the modern cameras an eye level finder is provided on the camera body, and when this is in use the camera must be held near or against the operator's face. It is frequently inconvenient to reach the usual shutter trigger when the camera is so positioned, and I have accordingly provided a shutter release on the camera body which can be readily grasped by the hands of the operator in using the camera at eye level.

Coming now to the drawing wherein like reference characters denote like parts throughout:

Fig. 1 is a fragmentary side elevation partially in section with portions of the camera removed in which a shutter release constructed in accordance with and embodying a preferred form of my invention is shown.

Fig. 2 is a fragmentary side elevation partially in section of certain of the camera parts shown in Fig. 1 moved to a partially folded position.

Fig. 3 is a fragmentary front elevation of a shutter equipped with the releasing mechanism shown in the preceding figures.

By way of illustration I have indicated in the drawing a camera of a known foldable type in which there is a camera body 1 to which a bed 2 is attached by means of the hinge pintle 3. This bed is adapted to swing from a closed position against the camera body 1 to the position shown in Fig. 1, which is its operative position wherein the parts are erected into a picture-taking position.

If desired, the camera may be provided with an automatically erecting front which in this case includes a lens board 4 carrying a shutter 5, this lens board being supported by a pair of similar braces 6 pivotally attached at 7 to a bracket 8 carried by the camera bed 2, and pivotally attached at 9 to a brace 10 which is likewise pivotally attached at 11 to the camera body 1. In addition to this mechanism there is a supplementary lens board supporting link 12 pivoted at 13 to the bracket 8, and at 14 to the link 6. The pivotal points are so arranged that when the camera bed 2 is turned upon its pivot 3, the parts are moved to the erect position shown in Fig. 1 when the bed is moved from the camera, and when the bed is moved in a reverse direction, the parts are caused to fold inside of the camera body 1. As thus far described the mechanism is all known.

In order to lock the lens board 4 in an erect position there is a latch which includes a curved end 15 on a flange 16 which forms a part of the brace 6. This end is adapted to engage a notch 17 formed in an end flange 18 which is bent upwardly from the hinged releasing member 19. Member 19 is pivoted at 20 to the brackets 8, and when a central raised finger piece 21 (shown only in Figure 3) is depressed, the latch elements 15 and 17 are disengaged and the parts may fold.

Coming now to my invention, I provide a shutter release in the form of a finger piece 21 which is carried by a bell crank lever 22 pivoted upon a stud 23 inside of the camera body. Arm 22 carries a stud 24, the purpose of which is to move the arm 22 backwardly as the camera parts are folded, so that the finger piece 21 may lie within the notch 25 substantially flush with the camera body when the camera is in a folded position. Arm 26 of the bell crank lever carries a stud 27 on which the link 28 is also pivotally attached. This arm likewise carries a turned-over flange 29 adapted to lie beneath an edge 30 of the link 28. This link is shaped as indicated at 31, so that when the camera is open, the body portion of the link will lie inside of the camera bed 2 for at least a part of its length. A portion of link 28 is bent upwardly as indicated at 32, and is provided with a slot 33 arcuate in form and having a portion of the slot 35 extending substantially parallel to the lens board 4. A screw 36 passes through this slot, and its purpose is to guide the movement of the link 31.

When the finger piece 21 is pressed inwardly in the direction shown by the arrow in Fig. 1, the bell crank lever 22 will be rocked upon its pivot 23 and the flange 29 will cause the lever 31 to move upwardly in the direction shown by the arrow, so that the straight portion 35 of the slot will ride on the stud 36. This upward movement causes an edge 37 of the arm 31 to engage a flange 38 of a bell crank lever pivoted at 39 upon the lens board 4, and having an arm 40 pivotally attached at 41 to the usual shutter trigger 42. When the lever 31 is moved in the direction shown by the arrow, as above described, the lever 40 will be rocked upon the pivot 39, moving the trigger 42 from the position shown in full lines to the position shown in broken lines to make an exposure. Thus, the trigger can be operated from the finger piece 21.

However, the trigger 42 can be depressed to make an exposure in the usual manner without pressing upon the finger piece 21, and when pressure is applied directly to the trigger, the end 38 of lever 40 will ride away from the operating position 37 of lever 31 to make an exposure.

In opening the camera the finger piece 21 is projected away from the camera body, and into an operative position. This is accomplished merely by opening the bed 2, which movement causes the lever 31 to swing upon its stud 27 until portion 30 lies against the bent-over lug 29. The weight of the link 31, by pressing upon lug 29, will turn the lever 22 about its pivot 23 so that the finger piece 21 will project from the camera.

In order to move the finger piece back flush against the camera body 1 and into its recess 25, the stud 24 comes into play. The stud projects from the arm 22 into the path of the lever 31, and it is positioned so that a part 32 of the lever 31 which is curved may strike the pin 24 as the camera is folded slightly beyond the position shown in Fig. 2, thus moving the lever 22 about its pivot 23 and into an inoperative position.

I have provided a shutter operating release on the camera body on one side of the camera body only, since it is generally convenient to have such a release on the same side as that on which a direct view finder may be mounted. However, the position of the release is immaterial as it may be conveniently arranged on either side of the camera body.

What I claim is:

1. In a folding camera, the combination with a camera body, of a foldable front for the camera movably mounted thereon to move to a picture taking open position and to a closed folded position, a shutter carried by the foldable front, a shutter release mounted on the camera body and operably connected to the shutter, the shutter release including a member movably mounted on the camera body and adapted to be projected therefrom by moving the foldable front to a picture taking position.

2. In a folding camera, the combination with a camera body, of a foldable front for the camera movably mounted thereon to move to a picture taking open position and to a closed folded position, a shutter carried by the foldable front, a shutter release mounted on the camera body and operably connected to the shutter, the shutter release including a member movably mounted on the camera body, the connections positioned and arranged to move the release from the camera body into a shutter actuating position as the foldable camera front is moved to a picture taking position.

3. In a folding camera, the combination with a camera body, of a bed hinged thereto, a lens board and shutter foldably mounted on the bed, connecting members between the camera body, foldable lens board and the camera bed adapted to automatically erect the shutter into a picture taking position, a shutter release carried by the camera body, a linkage connecting the release and shutter, said linkage including an arm foldably attached to the connecting members for automatically erecting the camera whereby the arm may fold with the connecting members.

4. In a folding camera, the combination with a camera body, of a bed hinged thereto, a lens board and shutter foldably mounted on the bed, connecting members between the camera body, foldable lens board and the camera bed adapted to automatically erect the shutter into a picture taking position, a shutter release carried by the camera body, a linkage connecting the release and shutter, said linkage including a slotted arm, a pivotal mount for the slotted arm, a pin on a connecting member engaged in the slot of the arm whereby the slotted arm and connecting member may move in predetermined relationship as the camera shutter is moved to a picture taking position.

5. In a folding camera, the combination with a camera body, of a bed hinged thereto, a lens board and shutter foldably mounted on the bed, connecting members between the camera body, foldable lens board and the camera bed adapted to automatically erect the shutter into a picture taking position, a shutter release movably mounted on the camera body, a linkage connecting the release and shutter, said linkage including an arm foldably attached to the connecting members for automatically erecting the camera whereby the arm may fold with the connecting members, and parts carried by the release member and the connecting members adapted to move the release to an inoperative position when the lens board and shutter are folded from a picture taking position.

6. In a folding camera, the combination with a camera body, of a bed hinged thereto, a lens board and shutter foldably mounted on the bed, connecting members between the camera body, foldable lens board and the camera bed adapted to automatically erect the shutter into a picture taking position, a shutter release movably mounted on the camera body, a linkage connecting the release and shutter, said linkage including an arm foldably attached to the connecting members for automatically erecting the camera whereby the arm may fold with the connecting members, the shutter release and connecting linkage being positioned and arranged to project the release from the camera into an operative position as the camera is erected into a picture taking position.

7. In a folding camera of the self-erecting front type a camera body, a lens board, a shutter mounted thereon, a front erecting structure carried by the camera and adapted to position the camera in an open picture taking position and in a folded position, a linkage cooperating with the front erecting structure operably connected to the camera shutter, a release lever movably mounted on the camera body and cooperating with the linkage, and means including the front erecting structure for moving the release lever into an inoperative position when the camera is folded.

8. In a folding camera, the combination with a camera body, of a camera front movably mounted on the body, mechanism for erecting the front automatically including braces connected to the camera body and front, a shutter carried by the camera front and adapted to be positioned for taking pictures by the front and braces, a shutter release on the camera body including a lever movable relative thereto, a linkage connecting the shutter release and shutter and including a lever arranged substantially parallel to a front brace, and connections between the lever and brace by which the latter is moved to and from a picture taking position by the front erecting mechanism.

9. In a folding camera, the combination with a camera body, of a camera front moveably mounted on the body, mechanism for erecting the front automatically including braces connected to the camera body and front, a shutter carried by the camera front and adapted to be positioned for taking pictures by the front and braces, a shutter release on the camera body including a lever moveable relative thereto, a linkage connecting the shutter release and shutter and including a lever arranged substantially parallel to a front brace, and connections between the lever and brace by which the latter is moved to and from a picture taking position by the front erecting mechanism, a shutter trigger, and means connected to the trigger and lying in the path of the lever for operating the shutter trigger from the shutter release mounted on the camera body.

10. In a folding camera, the combination with a camera body, of a camera front moveably mounted on the body, mechanism for erecting the front automatically including braces connected to the camera body and front, a shutter carried by the camera front and adapted to be positioned for taking pictures by the front and braces, a shutter release on the camera body including a lever moveable relative thereto, a linkage connecting the shutter release and shutter including a lever arranged substantially parallel to a front brace, and connections between the lever and brace by which the latter is moved to and from a picture taking position by the front erecting mechanism, a shutter trigger, and means for moving the shutter release to an inoperative position on the camera body including cooperating parts on a brace and the lever adapted to contact as the camera is folded.

AUGUST NAGEL.